United States Patent
Arroyo et al.

(10) Patent No.: US 10,115,168 B2
(45) Date of Patent: Oct. 30, 2018

(54) INTEGRATING METADATA FROM APPLICATIONS USED FOR SOCIAL NETWORKING INTO A CUSTOMER RELATIONSHIP MANAGEMENT (CRM) SYSTEM

(71) Applicant: International Business Machines Corporation, Armonk, NY (US)

(72) Inventors: Jorge A. Arroyo, Carmel, IN (US); Stephen P. Kruger, Dublin (IE); Luciano Silva, Apex, NC (US); Patrick J. O'Sullivan, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 758 days.

(21) Appl. No.: 14/639,537

(22) Filed: Mar. 5, 2015

(65) Prior Publication Data
US 2015/0332289 A1   Nov. 19, 2015

Related U.S. Application Data

(63) Continuation of application No. 14/281,042, filed on May 19, 2014, now Pat. No. 9,626,727.

(51) Int. Cl.
*G06F 17/30* (2006.01)
*G06Q 50/00* (2012.01)
*G06Q 30/02* (2012.01)

(52) U.S. Cl.
CPC ......... *G06Q 50/01* (2013.01); *G06Q 30/0201* (2013.01)

(58) Field of Classification Search
CPC .................... G06C 50/01; G06C 30/0201

USPC .................................................. 707/741, 803
See application file for complete search history.

(56) References Cited

U.S. PATENT DOCUMENTS

| | | | | |
|---|---|---|---|---|
| 7,716,159 | B2* | 5/2010 | Mall ...................... | G06Q 30/02 705/7.32 |
| 8,731,918 | B2* | 5/2014 | Wasserblat .............. | G10L 15/26 704/231 |
| 2007/0100739 | A1* | 5/2007 | Cui ......................... | G06Q 30/08 705/37 |
| 2008/0147478 | A1* | 6/2008 | Mall ...................... | G06Q 30/02 705/14.4 |
| 2008/0301549 | A1* | 12/2008 | Czudak ............. | G06F 17/30265 715/274 |
| 2011/0125793 | A1* | 5/2011 | Erhart .................... | G06Q 30/02 707/776 |

(Continued)

OTHER PUBLICATIONS

List of IBM Patents or Patent Applications Treated as Related, May 27, 2015, pp. 1-2.

*Primary Examiner* — Phong H Nguyen
(74) *Attorney, Agent, or Firm* — Fabian VanCott; Steven L. Nichols

(57) ABSTRACT

Integrating metadata from applications used for social networking into a customer relationship management (CRM) system includes obtaining, from applications used for social networking, metadata associated with users of the applications, analyzing the metadata from the applications to infer opportunities, relationships for mapping clients, structures, and subject matter experts, and integrating the opportunities, the relationships for mapping the clients, the structures, and the subject matter experts into a CRM system to populate the CRM system.

9 Claims, 5 Drawing Sheets

(56) References Cited

U.S. PATENT DOCUMENTS

| | | | |
|---|---|---|---|
| 2012/0059767 A1 | 3/2012 | Uthmann | |
| 2012/0215535 A1* | 8/2012 | Wasserblat | G10L 15/26 704/243 |
| 2013/0110932 A1* | 5/2013 | Itani | H04L 29/08072 709/204 |
| 2013/0218640 A1* | 8/2013 | Kidder | G06Q 30/0254 705/7.33 |
| 2014/0081702 A1* | 3/2014 | Rohde | G06Q 30/0201 705/7.29 |
| 2014/0136958 A1* | 5/2014 | Scattergood | H04L 67/2823 715/236 |
| 2015/0088779 A1* | 3/2015 | Falcone | G06Q 10/083 705/330 |

* cited by examiner

INTEGRATING METADATA FROM APPLICATIONS USED FOR SOCIAL NETWORKING INTO A CUSTOMER RELATIONSHIP MANAGEMENT (CRM) SYSTEM

BACKGROUND

The present invention relates to integrating metadata into a customer relationship management (CRM) system, and more specifically, to integrating metadata from applications used for social networking into a CRM system.

A CRM system uses techniques and methods to gather, organize, automate, and synchronize sales, for marketing, customer service, and technical support. This information is stored in the CRM system's memory. Further, this information is retrieved from the CRM system's memory and analyzed to allow a company to better target various customers.

BRIEF SUMMARY

A method for integrating metadata from applications used for social networking into a customer relationship management (CRM) system includes obtaining, from applications used for social networking, metadata associated with users of the applications, analyzing the metadata from the applications to infer opportunities relationships for mapping clients, structures, and subject matter experts, and integrating the opportunities, the relationships for mapping the clients, the structures, and the subject matter experts into CRM system to populate the CRM system.

A system for integrating metadata from applications used for social networking into a CRM system includes an obtaining engine to obtain, from applications used for social networking, metadata associated with users of the applications, an analyzing engine to analyze the metadata from the applications to infer opportunities, relationships for mapping clients, structures, and subject matter experts, an integrating engine to integrate the opportunities, the relationships for mapping the clients, the structures, and the subject matter experts into a CRM system to populate the CRM system, and an updating engine to update the CRM system based on modifications made by the users in the applications.

A computer program product includes a computer readable storage medium, the computer readable storage medium having computer readable program code embodied therewith. The computer readable program code having computer readable program code to analyze metadata from applications to infer opportunities, relationships for mapping clients, structures, and subject matter experts, integrate the opportunities, the relationships for mapping the clients, the structures, and the subject matter experts into a CRM system to populate the CRM system, and update the CRM system based on modifications made by the users in the applications.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
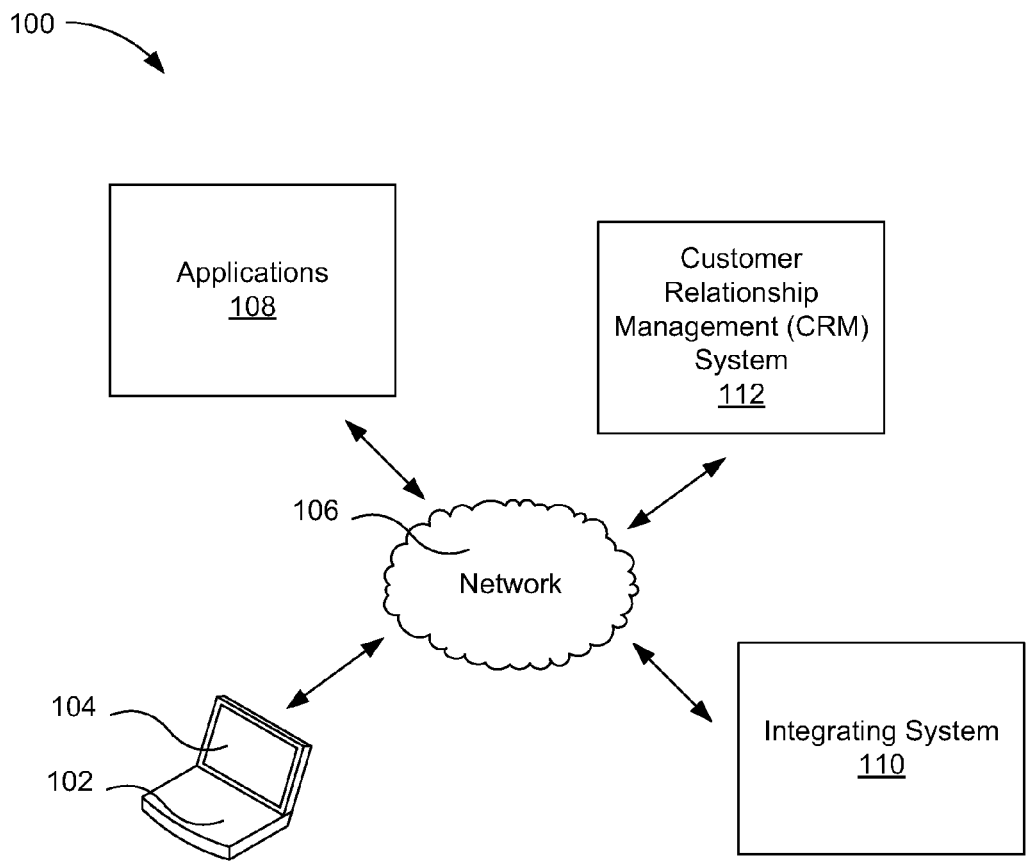
FIG. 1 is a diagram of an example of a system for integrating metadata from applications used for social networking into a customer relationship management (CRM) system, according to one example of principles described herein.

The present specification describes a method and system for integrating metadata from applications used for social networking into a customer relationship management (CRM) system, such that the CRM system is quickly populated with metadata from the applications.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the CRM system uses techniques and methods to organize, automate, and synchronize sales, for marketing, customer service, and technical support. This information that the CRM system gathers is stored in the CRM system's memory. Further, this information may be categorized as opportunities in the CRM system's memory. A user associated with a company may view the opportunities gather by the CRM system to allow the company to better target various customers.

Often, new CRM systems lack any rich data or relationships that are associated with this information. Over time the new CRM systems are populated with rich data or relationships that are associated with this information. However, the time needed to populate the new CRM system with rich data or relationships may be significant. As a result, a new CRM system may not be effective in targeting various customers for quite some time.

The principles described herein include a system and a method for integrating metadata from applications used for social networking into a CRM system. Such a system and method include includes obtaining, from applications used for social networking, metadata associated with users of the applications, analyzing the metadata from the applications to infer opportunities relationships for mapping clients, structures, and subject matter experts, and integrating the opportunities, the relationships for mapping the clients, the structures, and the subject matter experts into a CRM system to populate the CRM system. Such a method and system allows a CRM system to be quickly populated with metadata from the applications. As a result, the CRM system may become effective very quickly in targeting various customers.

In the specification and appended claims, the term "opportunities" is meant to be understood broadly as a complex record structure in a database, in which each of the opportunities captures a number of fields of metadata. In one example, the opportunities may include a business's sales and/or interaction with current customers, future customers, or combinations thereof.

In the specification and appended claims, the term "application" is meant to be understood broadly as a computer program for an online community of users with a common interest who use a website or other technologies to communicate with each other and share information and resources for social networking. Further, the application may include metadata that maps relationships between users. In one example, the relationships indicate the ways in which the users are connected through various social familiarities ranging from casual acquaintance to close familial bonds. In one example, the applications may be electronic mail (email) applications, instant messages (IM) applications, text messages (TM) applications, social network applications, blog applications, newsfeed applications, short message service (SMS) applications, other applications or combinations thereof.

In the specification and appended claims, the term "subject matter experts" is meant to be understood broadly as individuals that are specialists in a specific area. For example, a subject matter expert may be specialist in a specific product. In one example, a subject matter expert may be a user of an application used for social networking.

In the specification and appended claims, the term "structure" is meant to be understood broadly as an organizational arrangement of artifacts associated with an application or a CRM system. For example, a structure may include a physical structure of the applications. In one example, a structure may include a digital structure of the application's metadata. In another example, the structure may include relationships for the users of the application. For example, the relationships for the users of the application may include client team structures, opportunity team structures, other structures, or combination thereof.

In the specification and appended claims, the term "metadata" is meant to be understood broadly as data that describes users of applications. In one example, the metadata is derived from interactions between the users of the applications. In another example, the metadata is based on historical patterns across the applications. In yet another example, the metadata is used to infer a social graph, subject matter experts, opportunities, relationships for mapping clients, contacts, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of an example of a system for integrating metadata from applications used for social networking into a CRM system, according to one example of principles described herein. As will be described below, an integrating system is in communication with a network to obtain, from applications used for social networking, metadata associated with users of the applications. The integrating system further analyzes the metadata from the applications to infer opportunities relationships for mapping clients, structures, and subject matter experts. Further, the integrating system integrates the opportunities, the relationships for mapping the clients, the structures, and the subject matter experts into a CRM system to populate the CRM system.

As illustrated in FIG. 1, the system (100) includes a number of applications (108). As will be described in other parts of this specification, the applications (108) may be used for social networking. For example, the applications (108) may be email applications, IM applications, TM applications, social network applications, blog applications, newsfeed applications, or SMS applications. In one example, a user device (102) allows a user to access the applications (108). As a result, the user is able to share information with other users using the applications (108). As will be described below, the applications (108) may produce metadata about the user.

As illustrated in FIG. 1, the system (100) includes an integrating system (110). The integrating system (110) obtains, from the applications (108) used for social networking, metadata associated with users of the applications (108). In one example, the metadata from the applications (108) is derived from interactions between the users of the applications and based on historical patterns across the applications to infer a social graph, subject matter experts, opportunities, relationships for mapping clients, contacts, or combinations thereof.

The integrating system (110) further analyzes the metadata from the applications (108) to infer the opportunities, the relationships for mapping the clients, the structures, and the subject matter experts. In one example, the integrating system (110) analyzes the metadata from the applications (108) via data mining.

Further, the integrating system (110) integrates the opportunities, the relationships for mapping the clients, the structures, and the subject matter experts into a CRM system (112) to populate the CRM system (112). In this example, the CRM system (112) may be a new CRM system that is absent of this information. By integrating this information into the CRM system (112), the CRM system (112) is quickly populated with metadata from the applications (108). As a result, the CRM system (112) may become effective very quickly for targeting various customers.

Further, the integrating system (110) updates the CRM system (112) based on modifications made by the users in the applications (108). In one example, the integrating system (110) updates the CRM system based on the modifications made by the users, via the user device (102), to the applications (108) by updating the opportunities, the relationships for mapping the clients, the structures, and the subject matter experts in the CRM system (112). More information about the integrating system (112) will be described in later parts of this specification.

While this example has been described with reference to the integrating system being located over the network, the integrating system may be located in any appropriate location. For example, the integrating system may be located in a user device, a database, a CRM system, other locations, or combinations thereof.

Figure 2:
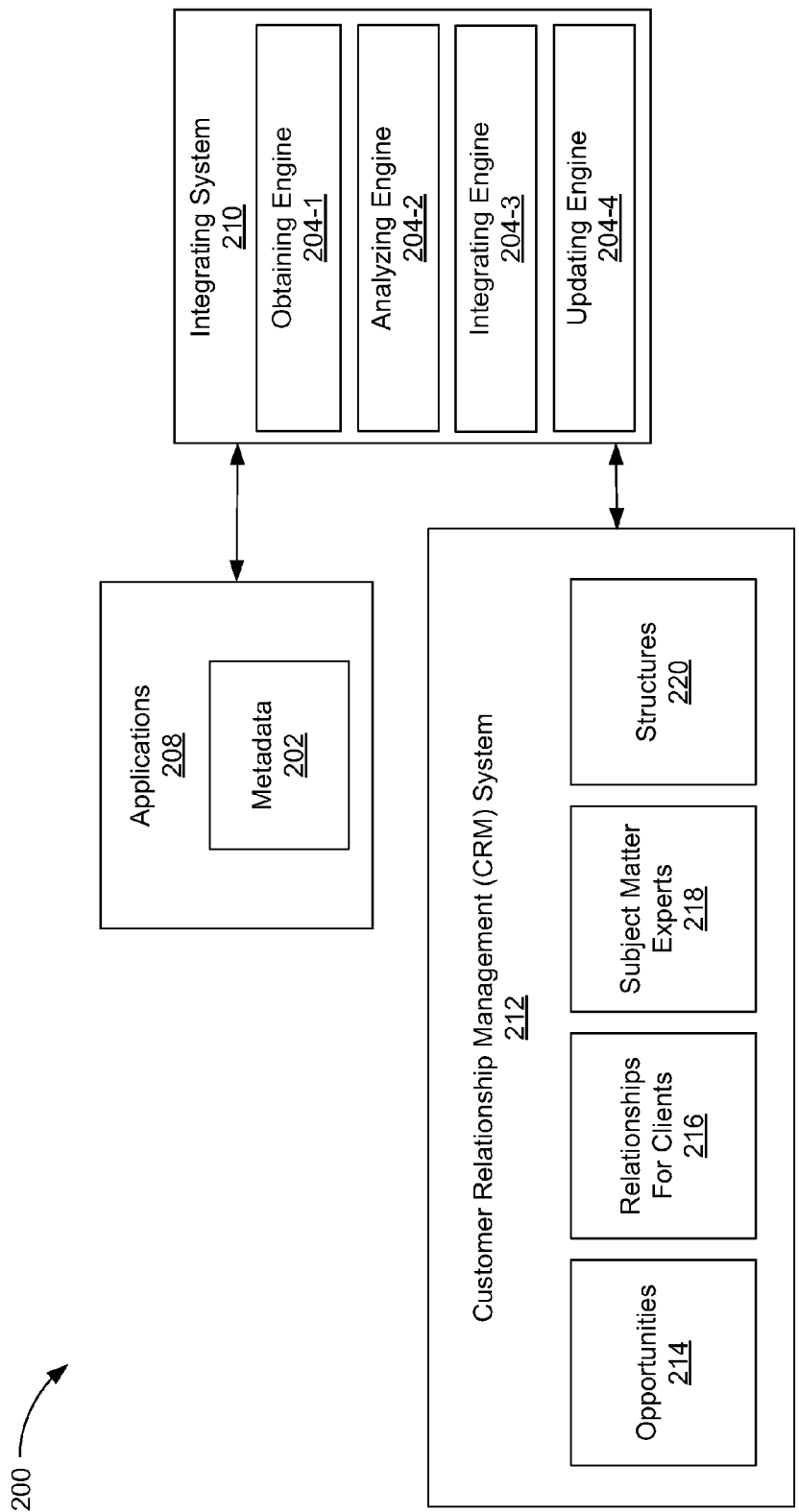
FIG. 2 is a diagram of an example of a system for integrating metadata from applications used for social networking into a CRM system, according to one example of principles described herein.

FIG. 2 is a diagram of an example of a system for integrating metadata from applications used for social networking into a CRM system, according to one example of principles described herein. As mentioned above, all the information, such as metadata, that the integrating system of FIG. 1 obtains is stored in the CRM system.

As illustrated in FIG. 2, the system (200) includes a number of applications (208). In one example, the applications (208) may include email applications, IM applications, TM applications, social network applications, blog applications, newsfeed applications, SMS applications, other applications, or combinations thereof.

In one example, the applications (208) may include metadata (202). In this example, the metadata (202) includes patterns, social graphs, relationships, structures, or combinations thereof of the users of the applications (208).

In one example, the metadata (202) for the patterns may indicate that most users access the applications (208) during a specific time. In another example, the patterns indicate that if user A is using the applications (208) an average of three other users will also use the applications (208). Further, the patterns may be historical patterns, current patterns, or predicted future patterns.

In one example, the metadata (202) for the social graphs may include a visual representation of relationships of the user of the applications (208). For example, a social graph may indicate that user A is connected to user B. As a result, the social graph may be used for mapping relationships for clients, subject matter experts, other users, or combinations thereof.

In one example, the metadata (202) for the structures may include a physical structure of the applications. In another example, the metadata (202) for the structures may include a digital structure of the applications. In yet another example, the metadata (202) for the structures may include structures for relationships for the users of the applications (208). For example, client team structures or opportunity team structures.

As illustrated in FIG. 2, the system (200) includes an integrating system (210). The integrating system (210) includes a number of engines (204). The engines (204) refer to a combination of hardware and program instructions to perform a designated function. Each of the engines (204) may include a processor and memory. The program instructions are stored in the memory and cause the processor to execute the designated function of the engine. As illustrated, the integrating system (210) includes an obtaining engine (204-1), an analyzing engine (204-2), an integrating engine (204-3), and an updating engine (204-4).

In one example, the obtaining engine (204-1) obtains, from applications (208) used for social networking, the metadata (202) associated with users of the applications (208). The obtaining engine (204-1) may obtain the metadata (202) for all the users of the applications (208). Alternatively, the obtaining engine (204-1) may obtain the metadata (202) for specific users of the applications (208).

In keeping with the given example, the analyzing engine (204-2) analyzes the metadata (202) from the applications (208) to infer opportunities relationships for mapping clients, structures, and subject matter experts. As mentioned above, the opportunities represent a complex record structure in the CRM system, in which each of the opportunities is associated with a number of fields of the metadata (202). In one example, the subject matter experts may be users that are specialists in a specific area. For example, a specialist in a specific product.

Once the metadata is analyzed, the integrating engine (204-3) then integrates the opportunities, the relationships for mapping the clients, the structures, and the subject matter experts into a CRM system (212) to populate the CRM system (212). As illustrated in FIG. 2, the CRM system (212) includes the opportunities (214), the relationships for the clients (216), the structures (220), and the subject matter experts (218).

In one example, the CRM system (212) is used as a model for managing a business's interactions with current and future customers. The CRM system (212) uses techniques and methods, such as the integrating system (210), to organize, automate, and synchronize sales, for marketing, customer service, and technical support. In one example, the integrating system (210) monitors the applications (208) to gather information to better target various customers. For example, current customers and potentially future customers.

In one example, the CRM system's strategy is based around customer engagement and interactions, with transactions being a byproduct. In this example, the CRM system (212) is a back-end process and system for managing customer relationships and data in an efficient and process-centric way. The CRM system (212) is able to understand the business's challenges that are to be solved, and then solving the challenges. Further, the CRM system (212) may be one component of developing a social or collaborative business, both internally and externally.

The updating engine (204-4) updates the CRM system (212) based on modifications made by the users in the applications (208). The updating engine (204-4) updates the CRM system (212) based on the modifications made by the users to the applications (208) by updating the opportunities (214), the relationships for the clients (216), the structures (220), and the subject matter experts (218) in the CRM system (212).

An example of a client and opportunity membership scenario will now be described with reference to FIG. 2. For this scenario, the integrating system (210) analyzes the metadata (202), such as all the memberships of particular communities, for specific metadata that would be of interest to CRM system (212). For example, the integrating system (210) analyzes the metadata (202) for specific client names and/or products and uses the membership lists of these communities to infer an equivalent relationship in a CRM system (212). For example, the integrating system (210) categorizes the particular communities as being product related. In this example, their memberships will map to opportunity team structures or customer related. In the case for the customer related, their memberships will map to client team structures.

The integrating system (210) uses this information to pre-populate a new CRM system with a relatively useful client hierarchy and team structure along with a fairly accurate set of initial opportunities based on existing communities discussing product related issues. More significantly, both of these CRM artifacts are now populated with relevant team structures, which provide a starting point for re-use in creation of the clients or opportunities going forward.

An example for expert identification will now be described with reference to FIG. 2. Using the set of CRM tagged social artifacts as described above, the integrating system (210) can use classical data mining techniques to identify a set of subject matter experts, be it around products, implementation, or selling. These profiles can then be used to assemble client and opportunity memberships by applying a profile for each of these artifacts. For example an opportunity template could include a project manager, a tech sales representative, and a developer. The integrating system (210) is then used to populate the expert structure in a CRM system (212). Further, examples may include pre-populating and creating communities, activities, IM groups, email realms, foundational reporting analytics and collectively wiring the relationships between these latter pieces so that the CRM system's context is realized in a plurality of parts.

In another example, a mature CRM system may be of interest to integrate the metadata (202) into. In this example, the integrating system (210) may use the updating engine (204-4) to update the opportunities, relationships for clients, subject matter experts, and structures in the mature CRM system accordingly.

Figure 3:
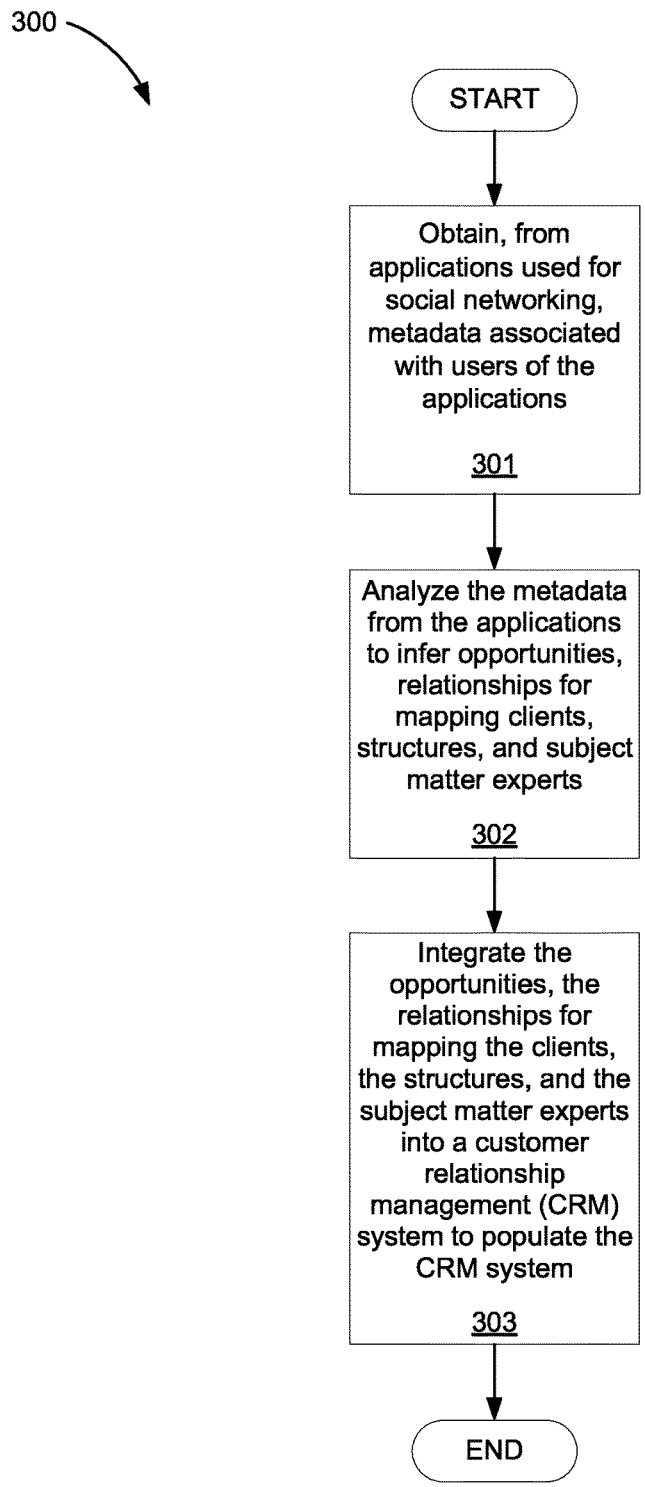
FIG. 3 is a flowchart of an example of a method for integrating metadata from applications used for social networking into a CRM system, according to one example of principles described herein.

FIG. 3 is a flowchart of an example of a method for integrating metadata from applications used for social networking into a CRM system, according to one example of principles described herein. In one example, the method (300) may be executed by the integrating system (100) of FIG. 1. In other examples, the method (300) may be executed by other systems (i.e. system 500 and system 600). In this example, the method (300) includes obtaining (301), from applications used for social networking, metadata associated with users of the applications, analyzing (302) the metadata from the applications to infer opportunities relationships for mapping clients, structures, and subject matter experts, and integrating (303) the opportunities, the relationships for mapping the clients, the structures, and the subject matter experts into CRM system to populate the CRM system.

As mentioned above, the method (300) includes obtaining (301), from applications used for social networking, metadata associated with users of the applications. As mentioned above, the metadata from the applications is derived from interactions between the users of the applications, based on historical patterns across the applications, and used to infer a social graph, subject matter experts, the opportunities, clients, relationships for mapping clients, contacts, or combinations thereof. As a result, the metadata includes patterns, social graphs, relationships for mapping clients, structures, or combinations thereof of the users of the applications.

As mentioned above, the method (300) includes analyzing (302) the metadata from the applications to infer opportunities, relationships for mapping clients, structures, and subject matter experts. As mentioned above, the opportunities represent a complex record structure in the CRM system and each of the opportunities is associated with a number of fields of the metadata.

In one example, data mining may be used to analyze the metadata. Data mining may be used to identify metadata that specific words, terms, phrases, or combinations thereof to infer opportunities, relationships for mapping clients, structures, and subject matter experts.

As mentioned above, the method (300) includes and integrating (303) the opportunities, the relationships for mapping the clients, the structures, and the subject matter experts into CRM system to populate the CRM system. As mentioned above, a CRM system is used as a model for managing a business's interactions with current and future customers. The CRM system uses techniques and methods to organize, automate, and synchronize sales, for marketing, customer service, and technical support. In one example, the CRM system may be a classical CRM system that monitors sources such as current customers and potentially future customers to gather information to better target various customers via applications. The classical CRM system traditionally includes a one-way communication between a business and the customer.

In another example the CRM system may be a social CRM system that monitors applications such as social media applications. In this example, the social CRM system's strategy is based around customer engagement and interactions, with transactions being a byproduct. In one example, the Social CRM system may use a philosophy and a business strategy, supported by a technology platform, business rules, workflow, processes and social characteristics, designed to engage the customer in a collaborative conversation in order to provide mutually beneficial value in a trusted and transparent business environment. Further, the social CRM system includes applications in marketing, customer service and sales, including peer-to-peer customer support, idea management, market research, product launch, brand reputation management.

In this example, the social CRM system is a back-end process and system for managing customer relationships and data in an efficient and process-centric way. The social CRM system is able to understand the business's challenges that are to be solved and then solve the business's challenges. Further, the social CRM system may be one component of developing a social or collaborative business, both internally and externally.

Regardless of if the CRM system is a classical CRM system or a social CRM system, the method (300) integrates the opportunities, the relationships for mapping the clients, the structures, and the subject matter experts into CRM system to populate the CRM system. In one example, the integrating the opportunities, the relationships for mapping the clients, the structures, and the subject matter experts into CRM system to populate the CRM system includes loading the opportunities, the relationships for mapping the clients, the structures, and the subject matter experts into CRM system's memory.

Figure 4:
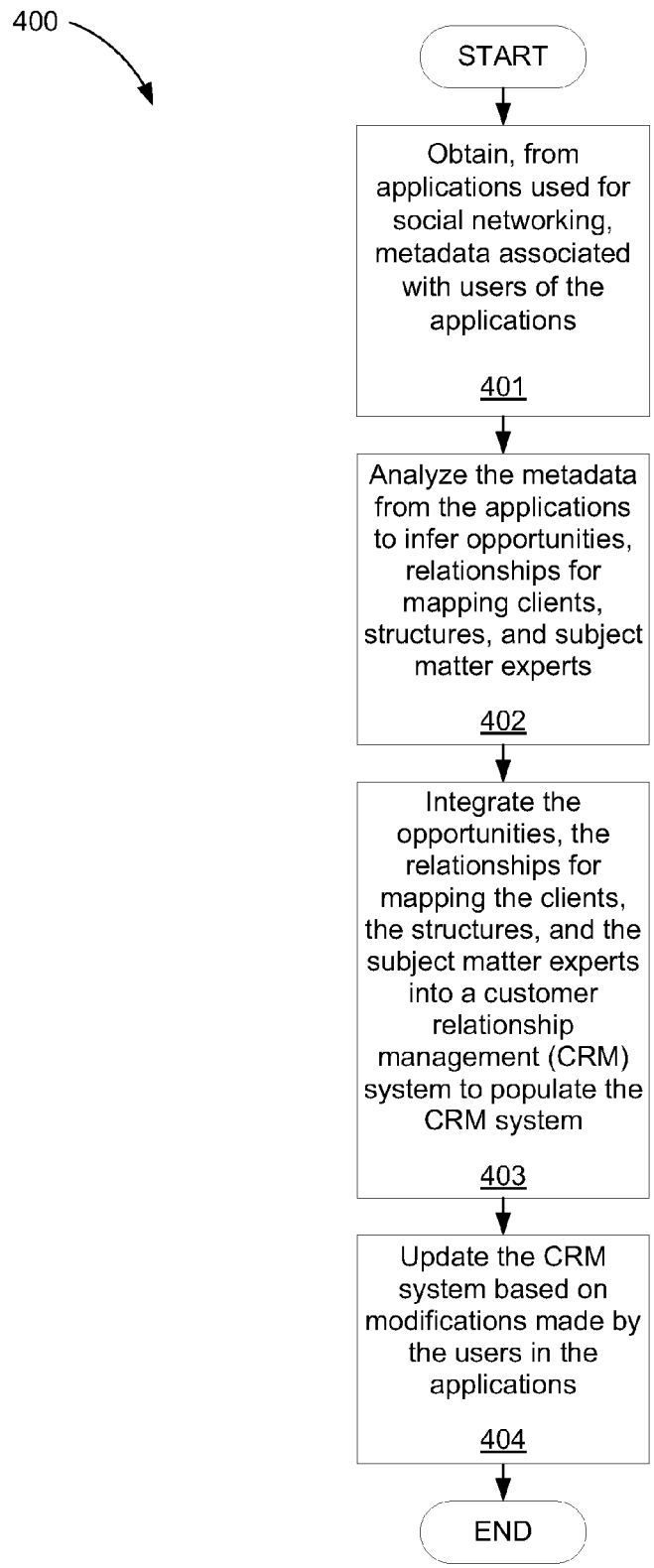
FIG. 4 is a flowchart of an example of a method for integrating metadata from applications used for social networking into a CRM system, according to one example of principles described herein.

FIG. 4 is a flowchart of an example of a method for integrating metadata from applications used for social networking into a CRM system, according to one example of principles described herein. In one example, the method (400) may be executed by the integrating system (100) of FIG. 1. In other examples, the method (400) may be executed by other systems (i.e. system 500 and system 600). In this example, the method (400) includes obtaining (401), from applications used for social networking, metadata associated with users of the applications, analyzing (402) the metadata from the applications to infer opportunities, relationships for mapping clients, structures, and subject matter experts, integrating (403) the opportunities, the relationships for mapping the clients, the structures, and the subject matter experts into CRM system to populate the CRM system, and updating (404) the CRM system based on modifications made by the users in the applications.

As mentioned above, the method (400) includes updating (404) the CRM system based on modifications made by the users in the applications. In one example, the method (400) updates the CRM system based on the modifications made by the users to the applications by updating the opportunities, the relationships for mapping the clients, the structures, and the subject matter experts in the CRM system.

In one example, the integrating system of FIG. 1 obtains the metadata from the application according to a factor such a time, an event, or other factors. If the integrating system of FIG. 1 determines the metadata obtained from the application has been modified, is new metadata, or is out of date, the CRM system is updated accordingly. This may include deleting some opportunities, some relationships for mapping the clients, some structures, and some subject matter experts in the CRM system and loading new opportunities, new relationships for mapping the clients, new structures, and new subject matter experts into the CRM system.

Figure 5:
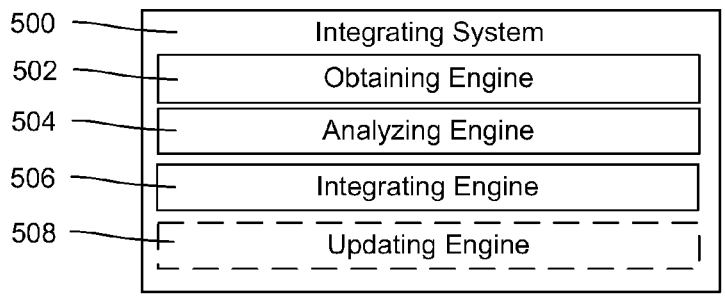
FIG. 5 is a diagram of an example of an integrating system, according to the principles described herein.

FIG. 5 is a diagram of an example of an integrating system, according to the principles described herein. The integrating system (500) includes an obtaining engine (502), an analyzing engine (504), and an integrating engine (506). In this example, the integrating system (500) also includes an updating engine (508). The engines (502, 504, 506, 508) refer to a combination of hardware and program instructions to perform a designated function. Each of the engines (502, 504, 506, 508) may include a processor and memory. The program instructions are stored in the memory and cause the processor to execute the designated function of the engine.

The obtaining engine (502) obtains from applications used for social networking, metadata associated with users of the applications. In one example, the metadata from the applications is derived from interactions between the users of the applications, based on historical patterns across the applications, and used to infer a social graph, subject matter experts, the opportunities, relationships for mapping clients, clients, contacts, or combinations thereof. Further, the applications may include email applications, IM applications, TM applications, social network applications, blog applications, newsfeed applications, SMS applications, other applications, or combinations thereof. In one example, the metadata includes patterns, social graphs, relationships for mapping clients, structures, or combinations thereof of the users of the applications.

The analyzing engine (504) analyzes the metadata from the applications to infer opportunities, relationships for mapping clients, structures, and subject matter experts. In one example, the opportunities represent a complex record structure in the CRM system and each of the opportunities is associated with a number of fields of the metadata.

The integrating engine (506), integrates the opportunities, the relationships for mapping the clients, the structures, and the subject matter experts into CRM system to populate the CRM system. In one example, the integrating engine (506), integrates specific opportunities, specific relationships for mapping the clients, specific structures, and specific subject matter experts into CRM system to populate the CRM system.

Figure 6:
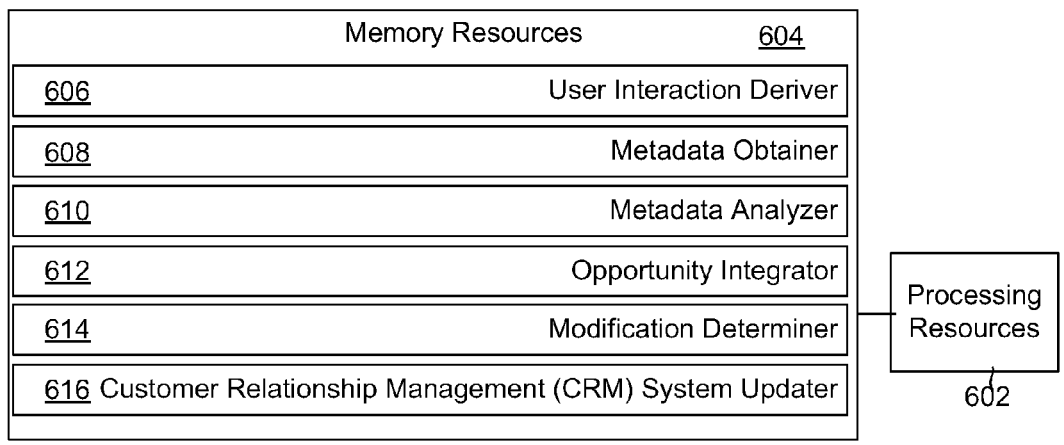
FIG. 6 is a diagram of an example of an integrating system, according to the principles described herein.

The updating engine (508) updates the CRM system based on modifications made by the users in the applications. In one example, the updating engine (508) updates the CRM system based on the modifications made by the users to the applications by updating the opportunities, the relationships for mapping the clients, the structures, and the subject matter experts in the CRM system FIG. 6 is a diagram of an example of an integrating system, according to the principles described herein. In this example, the integrating system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the integrating system (600). The programmed instructions shown stored in the memory resources (604) include a user interaction deriver (606), a metadata obtainer (608), a metadata analyzer (610), an opportunity integrator (612), a modification determiner (614), and a CRM system updater (616).

The memory resources (604) include a computer readable storage medium that contains computer readable program code to cause tasks to be executed by the processing resources (602). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The user interaction deriver (606) represents programmed instructions that, when executed, cause the processing resources (602) to derive interactions between the users of the applications and based on historical patterns across the applications to infer a social graph, subject matter experts, the opportunities, relationships for mapping clients, clients, contacts, or combinations thereof. The metadata obtainer (608) represents programmed instructions that, when executed, cause the processing resources (602) to obtain, from applications used for social networking, metadata associated with users of the applications.

The metadata analyzer (610) represents programmed instructions that, when executed, cause the processing resources (602) to analyze the metadata from the applications to infer opportunities, relationships for mapping clients, structures, and subject matter experts. The opportunity integrator (612) represents programmed instructions that, when executed, cause the processing resources (602) to integrating the opportunities, the relationships for mapping the clients, the structures, and the subject matter experts into CRM system to populate the CRM system.

The modification determiner (614) represents programmed instructions that, when executed, cause the processing resources (602) to determine modifications made by the users in the applications. The CRM system updater (616) represents programmed instructions that, when executed, cause the processing resources (602) to update the CRM system based on modifications made by the users in the applications.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries, may be accessed from a remote location over a network connection while the programmed instructions are located locally. Thus, integrating system (600) may be implemented on a user device, on a server, on a collection of servers, or combinations thereof.

The integrating system (600) of FIG. 6 may be part of a general purpose computer. However, in alternative examples, the integrating system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A method for integrating metadata from applications used for social networking into a customer relationship management (CRM) system, the method comprising:
   obtaining, from applications used for social networking, metadata associated with users of the applications;
   analyzing the metadata from the applications to infer opportunities, relationships for mapping clients, structures, and subject matter experts;
   integrating the opportunities, the relationships for mapping the clients, the structures, and the subject matter experts into a customer relationship management (CRM) system to populate the CRM system;
   identifying potential customers based on integrated opportunities, relationships for mapping the clients, the structures, and the subject matter experts; and
   managing interactions with current and target customers based on the integrated opportunities, relationships for mapping the clients, the structures, and the subject matter experts.

2. The method of claim 1, in which the metadata from the applications is derived from interactions between the users of the applications, based on historical patterns across the applications, and used to infer a social graph, the subject matter experts, the opportunities, the relationships for mapping the clients, contacts, or combinations thereof.

3. The method of claim 1, in which the applications comprises electronic mail (email) applications, instant messages (IM) applications, text messages (TM) applications, social network applications, blog applications, newsfeed applications, or short message service (SMS) applications.

4. The method of claim 1, in which the metadata comprises patterns, social graphs, the relationships for mapping the clients, the structures, or combinations thereof of the users of the applications.

5. The method of claim 1, further comprising updating the CRM system based on modifications made by the users in the applications.

6. The method of claim 5, in which updating the CRM system based on the modifications made by the users to the applications comprises updating the opportunities, the relationships for mapping the clients, the structures, and the subject matter experts in the CRM system.

7. The method of claim 1, in which the opportunities represent a complex record structure in the CRM system and each of the opportunities is associated with a number of fields of the metadata.

8. A method for integrating metadata from applications used for social networking into a customer relationship management (CRM) system, the method comprising:
   accessing a social networking application via a user device;
   accessing metadata on the social networking application, wherein the metadata:
      comprises:
         patterns;
         social graphs of users of the application;
         relationships;
         structures of the application; and
      is derived from:
         interactions between users of the application; and
         historical patterns across the application;
   determining, from the metadata, a subset of the metadata to infer opportunities, relationships for mapping clients, structures, and subject matter experts;
   determining from the subset of the metadata:
      when a user accesses the application;
      how many other users access the application when the user accesses the application;
   analyzing the metadata from the applications to infer:
      complex record opportunities that include multiple fields of metadata and that comprise an entity's interactions with customers,
      relationships for mapping clients,
      structures, and
      subject matter experts;
   integrating the opportunities, the relationships for mapping the clients, the structures, and the subject matter experts into a customer relationship management (CRM) system to populate the CRM system;
   organizing, automating, and synchronizing sales, marketing, customer service and technical support for an organization based on the integrated opportunities, relationships for mapping the clients, the structures, and the subject matter experts;
   identifying potential customers based on integrated opportunities, relationships for mapping the clients, the structures, and the subject matter experts; and
   managing interactions with current and target customers based on the integrated opportunities, relationships for mapping the clients, the structures, and the subject matter experts.

9. The method of claim 8, wherein the patterns are predicted future patterns.

* * * * *